United States Patent
Morimoto et al.

(10) Patent No.: US 12,148,982 B2
(45) Date of Patent: Nov. 19, 2024

(54) TOUCH SENSOR AND INTEGRATED ANTENNA INTEGRATED FILM

(71) Applicant: Meta Platforms Technologies, LLC, Menlo Park, CA (US)

(72) Inventors: Yasuo Morimoto, Cupertino, CA (US); Dong Chen, Kirkland, WA (US); Nengxiu Deng, Santa Clara, CA (US); Weihong Melissa Zhang, Long Grove, IL (US); Chilin Hsu, San Jose, CA (US); Danyang Huang, San Jose, CA (US); Ce Zhang, Sunnyvale, CA (US); Yonghua Wei, San Diego, CA (US); Jiang Zhu, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 14 days.

(21) Appl. No.: 18/066,925

(22) Filed: Dec. 15, 2022

(65) Prior Publication Data
US 2024/0097314 A1 Mar. 21, 2024

Related U.S. Application Data (60) Provisional application No. 63/342,582, filed on May 16, 2022.

(51) Int. Cl.
*H01Q 1/24* (2006.01)
*G04G 21/04* (2013.01)
(Continued)

(52) U.S. Cl.
CPC ............ *H01Q 1/243* (2013.01); *G04G 21/04* (2013.01); *G04G 21/08* (2013.01); *G06F 3/044* (2013.01); *H01Q 1/2283* (2013.01); *H01Q 1/24* (2013.01); *H01Q 1/273* (2013.01); *G06F 3/0416* (2013.01); *G06F 3/0443* (2019.05);
(Continued)

(58) Field of Classification Search
CPC .............. G06F 3/044; G06F 3/0416; G06F 2203/04103; G06F 2203/04112; G06F 3/04883; G06F 3/04164; G06F 3/0445; G06F 3/0443; G06F 3/0412; H01Q 1/24;
(Continued)

(56) References Cited

U.S. PATENT DOCUMENTS 11,016,542 B1    5/2021  Zhang et al.
2015/0331507 A1* 11/2015 Shachar ................ G06F 3/0445
                                                          345/173

(Continued)

FOREIGN PATENT DOCUMENTS

WO    WO-2021027534 A1 *  2/2021 ........... G06F 3/0412

OTHER PUBLICATIONS

International Search Report and Written Opinion for International Application No. PCT/US2023/022163, mailed Aug. 24, 2023, 12 pages.

*Primary Examiner* — Darlene M Ritchie
(74) *Attorney, Agent, or Firm* — Greenberg Traurig, LLP (57) ABSTRACT

A disclosed apparatus may include at least one touch sensor and an integrated film that includes at least one antenna, wherein the integrated film is at least partially disposed on the at least one touch sensor such that the at least one touch sensor operates as a radiating element for the at least one antenna. Various other apparatuses, systems, and methods are also disclosed.

20 Claims, 10 Drawing Sheets

(51) Int. Cl.
*G04G 21/08* (2010.01)
*G06F 3/041* (2006.01)
*G06F 3/044* (2006.01)
*H01Q 1/22* (2006.01)
*H01Q 1/27* (2006.01)
*H01Q 1/44* (2006.01)

(52) U.S. Cl.
CPC .. *G06F 3/0446* (2019.05); *G06F 2203/04103* (2013.01); *G06F 2203/04112* (2013.01); *H01Q 1/44* (2013.01)

(58) Field of Classification Search
CPC ........ H01Q 1/273; H01Q 1/22; H01Q 1/2258; H01Q 1/2266; G04G 21/04; G04G 21/08
See application file for complete search history.

(56) References Cited

U.S. PATENT DOCUMENTS

| | | |
|---|---|---|
| 2016/0188092 A1 | 6/2016 | Sebastian et al. |
| 2020/0209995 A1 | 7/2020 | So et al. |
| 2021/0263606 A1 | 8/2021 | Lee |
| 2022/0027013 A1* | 1/2022 | Kim ...................... G06F 1/1698 |
| 2022/0109229 A1* | 4/2022 | Kim ........................ H01Q 1/22 |
| 2022/0416403 A1* | 12/2022 | Choi ................... G06K 19/077 |

* cited by examiner

TOUCH SENSOR AND INTEGRATED ANTENNA INTEGRATED FILM

CROSS-REFERENCE TO RELATED APPLICATION

This application claims the benefit of U.S. Provisional Patent Application No. 63/342,582, filed May 16, 2022, the disclosure of which is incorporated, in its entirety, by this reference.

BRIEF DESCRIPTION OF THE DRAWINGS

The accompanying appendices illustrate a number of exemplary embodiments and are a part of the specification. Together with the following description, these appendices demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

Modern wearable devices must accommodate various electronic and mechanical components to provide a wide array of telecommunications functionality. Space is therefore at a premium in such devices, leaving few options for placement of antennas. Furthermore, some of the components included in such complicated wearable devices may cause electromagnetic interference, which may degrade or inhibit performance of some antenna technologies. As such, the antennas may need to be placed in a position that is sufficiently spatially separated from those components. Hence, the instant application identifies and addresses a need for new antenna technologies, some embodiments of which may be used in wearable or other small-form-factor devices.

In some of the embodiments described herein, one or more antennas may be at least partially placed on a display portion of an electronic device. These antennas may be transparent and, as such, may not occlude vision through the display. Transparent antennas may alternatively be referred to herein as antennas on display (AoDs), as they may be placed directly on at least some portion of the display. In some cases, AoDs may be integrated into touch sensors that are part of touchscreen displays. In such cases, the touch sensor pattern and the antenna pattern may be formed on the same substrate. This may reduce the cost of having additional layers (e.g., laminated to and/or formed within the substrate) and may also reduce a number of manufacturing issues that may be caused by having an increased number of layers within a display stack. When forming the touch sensor pattern and the antenna pattern on the same substrate, the area of the touch sensor/antenna pattern may be used to maximize the performance of both the touch sensor and the antenna.

In some of the embodiments described herein, an antenna feeder line may be connected directly to an existing touch sensor pattern. One or more of the touch sensor patterns may also act as an antenna. In some cases, the embodiments herein may position a capacitor in series between the antenna pattern and an antenna radio frequency integrated circuit (RFIC) to isolate the touch sensor signal from the antenna RFIC and its corresponding connection to ground. Still further, in order to isolate the antenna RF signal from the touch sensor load, the wiring resistance between the touch sensor and the touch sensor IC may be greater than a specified value (e.g., 300 Ohms). This embodiment may implement a specified wiring resistance between the touch sensor pattern and a corresponding touch sensor integrated circuit instead of using an inductor in series.

The present disclosure may include a system that has at least one touch sensor and an integrated film that includes at least one antenna. The integrated film may be at least partially disposed on the touch sensor. As such, the touch sensor may operate as a radiating element for the antenna. In some cases, the touch sensor and the integrated film that includes the antenna may be formed on the same substrate. Accordingly, when the antenna is excited, either in a transmitting capacity or in a receiving capacity, the touch sensor may also be excited. In this manner, the touch sensor itself may act as a radiating element that is part of an antenna. The antenna may be substantially any type of antenna, including monopole, dipole, loop, slot, or other type of antenna. Moreover, the antenna may include any type of associated radio including a cellular radio, a global positioning system (GPS) radio, a WiFi radio, a Bluetooth radio, a near-field communication (NFC) radio, an ultrawideband (UWB) radio, or other type of radio. In some embodiments, the antennas and the touch sensors may be formed on the same plane of the same substrate. As shown in some of the figures disclosed and described herein, the antenna may lie flat on top of the touch sensor.

In cases where the touch sensor includes an integrated antenna, the touch sensor may operate as both a touch sensor and a radiating element for the antenna. In such cases, the touch sensor may be directly fed by an antenna feed. The antenna feed may include RFICs, tuners, amplifiers, impedance matching circuits, signal processors, or other antenna feed components. These components may drive the touch sensor as a radiating element of the antenna.

In some cases, as noted above, the touch sensor and the antenna may be formed using a transparent conductive material. In some embodiments, this transparent conductive material may be mesh metal. In some cases, a measurement of sheet resistance of the transparent conductive material may be between 10 to 200 Ω/Sq. In some examples, the combined antenna and touch sensor component may include a capacitor in series between the combined touch sensor and antenna component and an RFIC. In such cases, the antenna feed line's resistance between the touch sensor and antenna component and a touch panel integrated circuit may be at least 300Ω. In some embodiments, the touch sensor and antenna component and the touch panel integrated circuit may be electrically connected without an in-series inductor. And, still further, the touch sensor and antenna component may include a slot cutout in at least a portion thereof. In some examples, this slot may be cut out of the outline or outer portion of the combined touch sensor and antenna component.

The following will provide, with reference to FIGS. 1-7, detailed descriptions of apparatuses and systems that may incorporate one or more antennas and one or more touch sensors. Detailed descriptions of corresponding methods of manufacture will be provided in connection with FIG. 8. Finally, detailed descriptions of one or more artificial reality systems that may incorporate embodiments of one or more of the apparatuses and/or systems described herein will be provided in connection with FIGS. 9-10.

Figure 1:
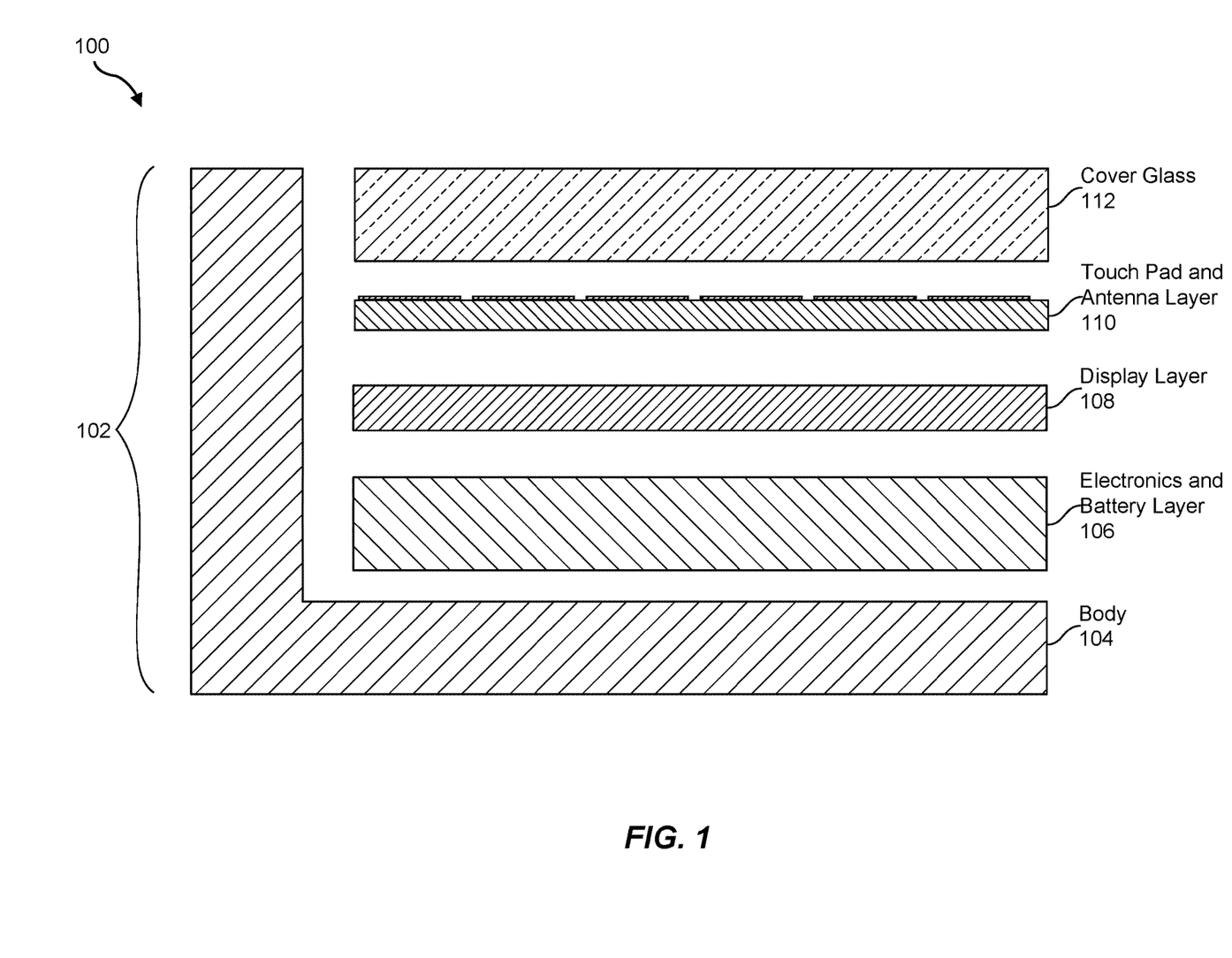
FIG. 1 is a cross-section view of a touch display in accordance with some embodiments described herein.

FIG. 1 shows a cross section 100 of a display stack 102. As shown, display stack 102 may include multiple layers that may each provide and/or perform one or more functions for a touch-enabled display device. Body 104 may include any rigid or moveable body that may house and/or form a housing for one or more additional layers of display stack 102. Body 104 may be formed from, composed of, and/or constructed from any suitable housing material that may include, without limitation, metal, plastic, polymer, combinations of one or more of the same, and so forth. In some examples, one or more additional layers of display stack 102 may be anchored within body 104 via any suitable anchoring mechanism, device, and/or material.

Electronics and battery layer 106 may include any suitable electrical components that may contribute to one or more functions of one or more components included in display stack 102. For example, as will be described in greater detail below, electronics and battery layer 106 may include a suitable RFIC that may be communicatively and/or electrically coupled to one or more antennas included in touch pad and antenna layer 110. Additionally, electronics and battery layer 106 may include a touch pad integrated circuit (TPIC) that may be communicatively and/or electrically coupled to one or more touch pads included in touch pad and antenna layer 110.

Display layer 108 may include one or more displays that may be configured to present any suitable visual data including, without limitation, images, videos, animations, and so forth.

As will be described in greater detail below, touch pad and antenna layer 110 (also "layer 110" herein) may include one or more touch pads and/or one or more antennas. In some examples, one or more touch pads included in layer 110 may be communicatively and/or electrically coupled to a TPIC included in electronics and battery layer 106. Additionally, in some embodiments, one or more antennas included in layer 110 may be communicatively and/or electrically coupled to an RFIC included in electronics and battery layer 106.

Finally, cover glass 112 may include and/or represent any material that may cover, protect, separate, and/or intermediate one or more layers included in display stack 102 from an external environment. In some examples, cover glass 112 may be configured to receive one or more touches and/or communicate one or more touches to one or more touch pad sensors included in layer 110.

Figure 2:
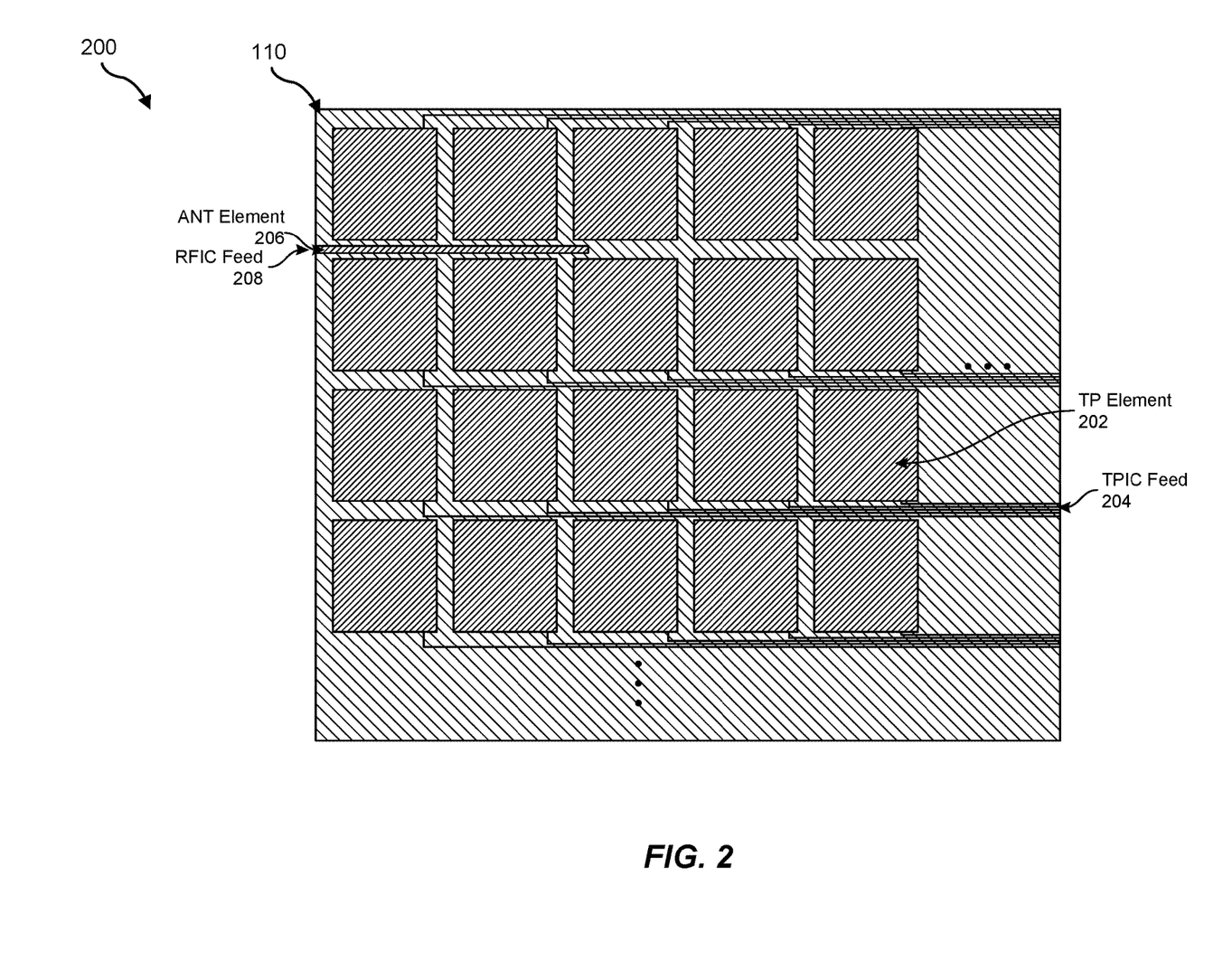
FIG. 2 is a top view of a touch layer of a touch display in accordance with some embodiments described herein.

FIG. 2 shows a top view 200 of layer 110. As shown, layer 110 includes at least one touch pad element 202 ("TP Element 202" in FIG. 2). For a sense of scale, in some embodiments, each TP element (e.g., TP element 202) may measure 7 mm×7 mm and may be separated from neighboring TP elements by a gap of approximately 500 μm. As further shown in FIG. 2, each touch pad element 202 may be coupled (e.g., physically, electrically, communicatively, etc.) to a TPIC (not shown in FIG. 2) via a TPIC feed 204. In some examples, TPIC feed 204 may have a sheet resistance of between 10 and 200 Ω/sq.

FIG. 2 also shows an antenna element 206 ("ANT element 206" in FIG. 2). As described above, antenna element 206 may be disposed on layer 110 and may be interposed between touch pad elements. In some examples, antenna element 206 may represent a monopole antenna having a width of approximately 300 μm and a length relative to a wavelength of electromagnetic radiation to be sent and/or received via the antenna element. For example, as shown in FIG. 2, antenna element 206 may have a length of $0.25\lambda$ at 2.4 GHz. As further shown in FIG. 2, antenna element 206 may be coupled (e.g., physically, electrically, communicatively, etc.) to an RFIC (not shown in FIG. 2) via an RFIC feed 208.

Figure 3:
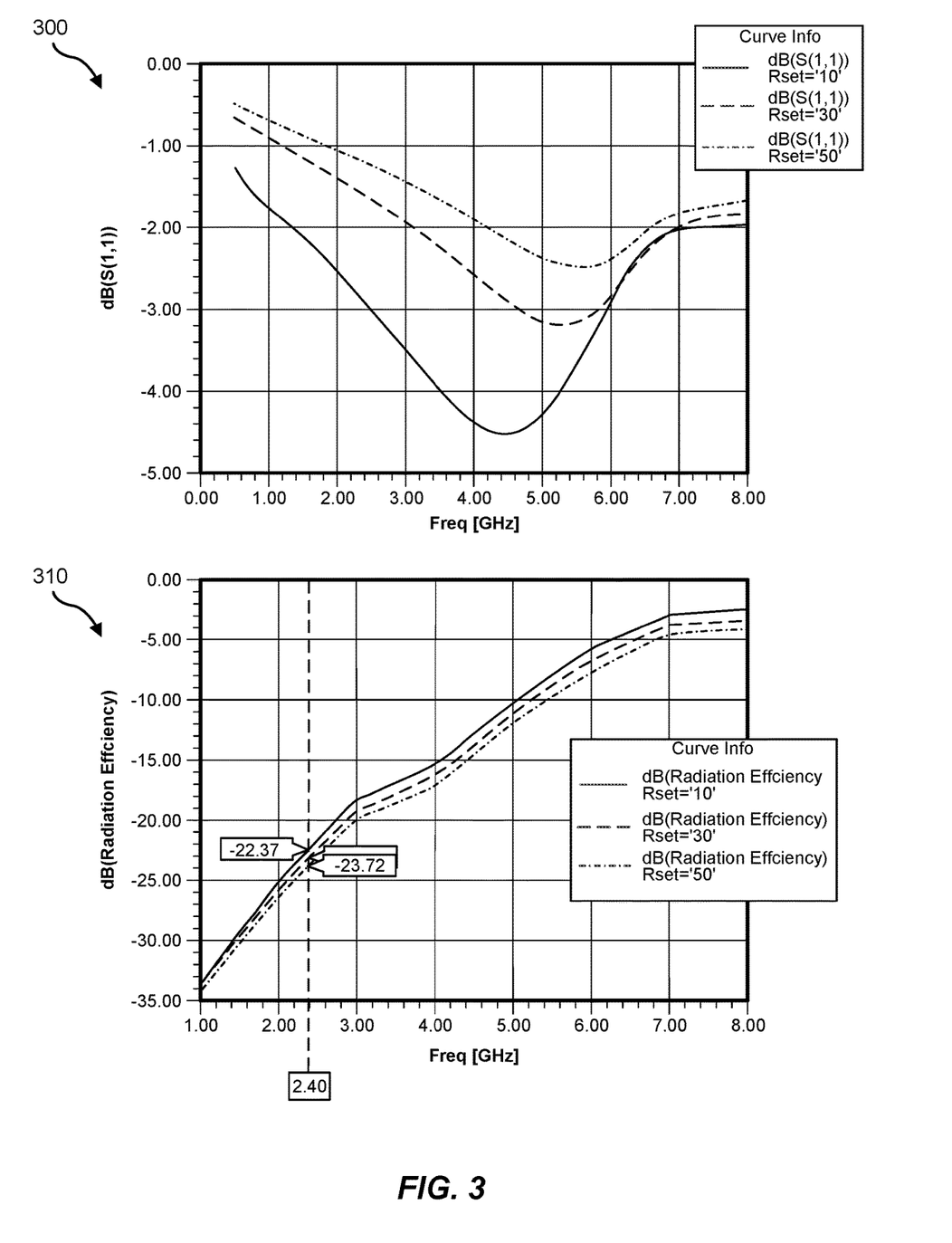
FIG. 3 shows a set of views of charts that illustrate possible improvements that some embodiments described herein may provide.
Figure 4:
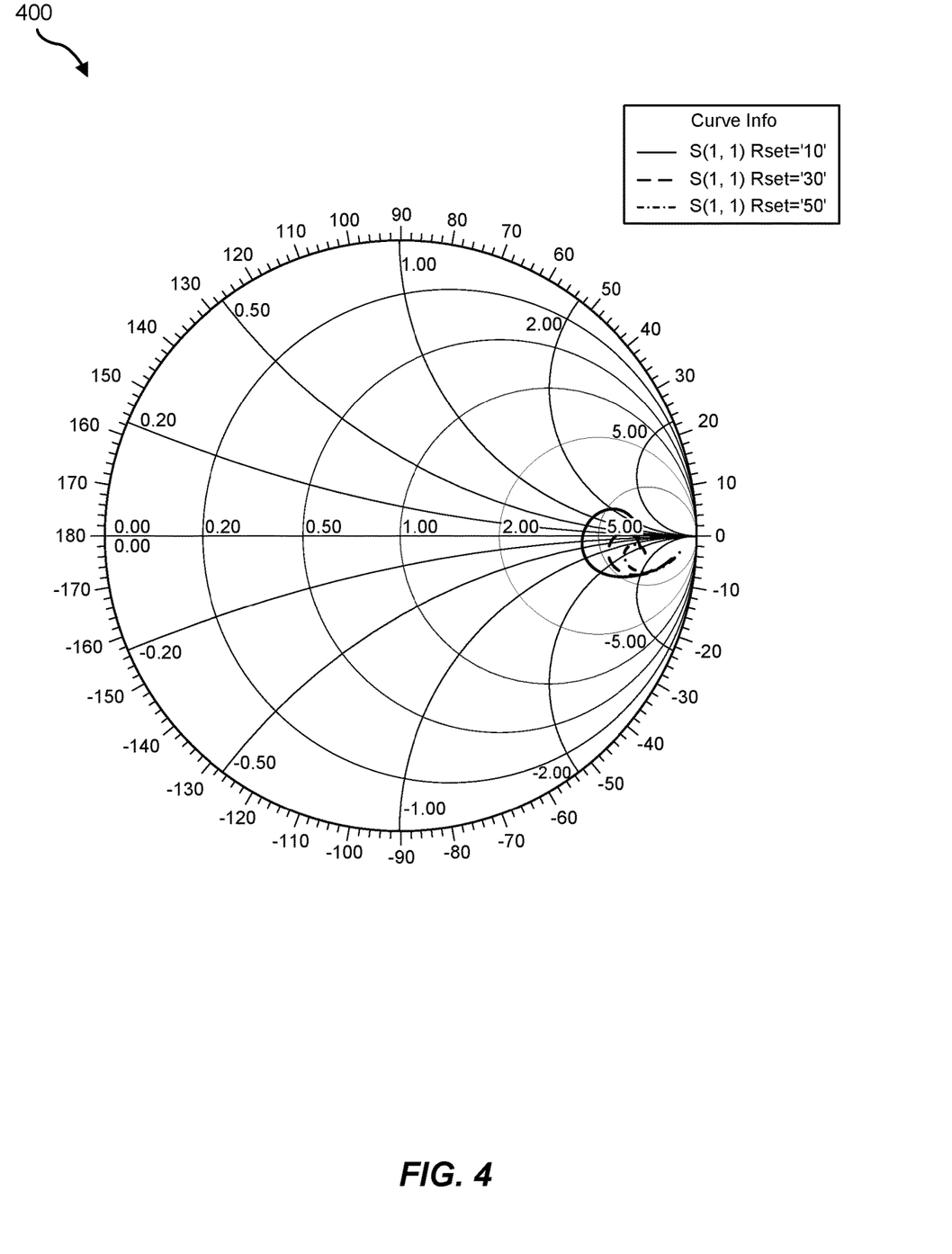
FIG. 4 shows a view of a Smith chart that illustrates possible improvements that some embodiments described herein may provide.

Some embodiments described herein may demonstrate favorable features and/or attributes for antenna functionality. FIGS. 3-4 illustrate possible experimental results that may be achieved through antenna and touch pad configurations similar to those shown in FIG. 2. FIG. 3 shows a chart 300 that plots curves of S-parameter S(1,1) values in decibels versus frequency in GHz for three different sheet resistance values: 10 Ω/sq., 30 Ω/sq., and 50 Ω/sq. FIG. 4 shows a chart 310 that plots curves of radiation efficiency in decibels versus frequency in GHz for three different sheet resistance values: 10 Ω/sq., 30 Ω/sq., and 50 Ω/sq. Likewise, FIG. 4 shows a Smith chart 400 that plots impedance versus frequency curves for the three different sheet resistance values: 10 Ω/sq., 30 Ω/sq., and 50 Ω/sq.

Figure 5:
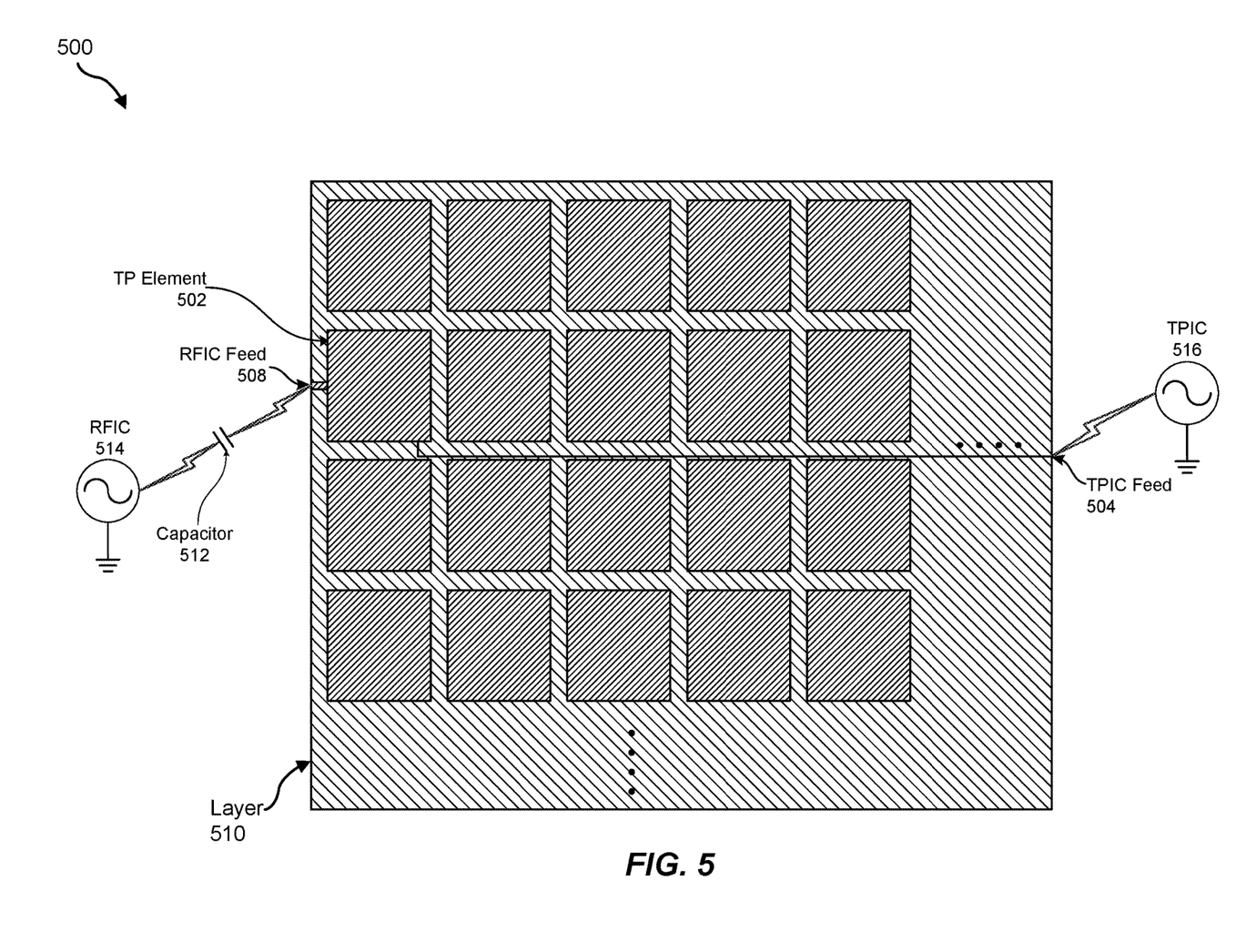
FIG. 5 is an additional top view of an additional touch layer of an additional touch display in accordance with some embodiments described herein.

As noted above, in some embodiments, an antenna feeder line may be connected directly to an existing touch sensor pattern. This may enable one or more of the touch sensor patterns to also act as an antenna. FIG. 5 shows a top view 500 of a layer 510. Layer 510 may be configured similarly to layer 110 in FIG. 1 and FIG. 2, with a TP element 502 similarly configured to TP element 202, TPIC feed 504 similarly configured to TPIC feed 204, and RFIC feed 508 configured similarly to RFIC feed 208. However, in this configuration, RFIC feed 508 is coupled (e.g., physically, electrically, communicatively, etc.) to TP element 502 and RFIC 514. In this configuration, RFIC feed 208 may excite one or more elements included in TP element 502, causing TP element 502 to operate as an antenna element and/or a radiating element for signals provided by and/or to RFIC 514.

As noted above, in some embodiments, the touch sensor (e.g., TP element 202) and the antenna (e.g., ANT element 206) may be formed using a transparent conductive material. In some embodiments, this transparent conductive material may be mesh metal. In some cases, a measurement of sheet resistance of the transparent conductive material may be between 10 to 200 Ω/Sq. In some examples, a combined antenna and touch sensor component (e.g., TP element 502) may include a capacitor in series between the combined touch sensor and antenna component and an RFIC. In such cases, the antenna feed line's resistance between the touch sensor and antenna component and a touch panel integrated circuit may be at least 300Ω. In some embodiments, the touch sensor and antenna component and the touch panel integrated circuit may be electrically connected without an in-series inductor. And, still further, the touch sensor and antenna component may include a slot cutout in at least a portion thereof. In some examples, this slot may be cut out of the outline or outer portion of the combined touch sensor and antenna component.

In some embodiments, as shown in FIG. 5, a capacitor 512 may be positioned in series between an antenna pattern included in and/or formed by one or more components of TP element 502 and RFIC 514 to isolate a touch sensor signal produced by TP element 502 from RFIC 514 and a corresponding connection to ground.

As further shown in FIG. 5, in order to isolate an antenna RF signal from a touch sensor load received and/or perceived by TP element 502, a wiring resistance between the TP element 502 and a TPIC 516 (e.g., via TPIC feed 504) may be greater than a predetermined or specified value (e.g., 300 Ohms). Hence, some embodiments may include and/or implement a specified wiring resistance between the touch sensor pattern (e.g., TP element 502) and a corresponding TPIC (e.g., TPIC 516) instead of using an inductor in series.

Figure 6:
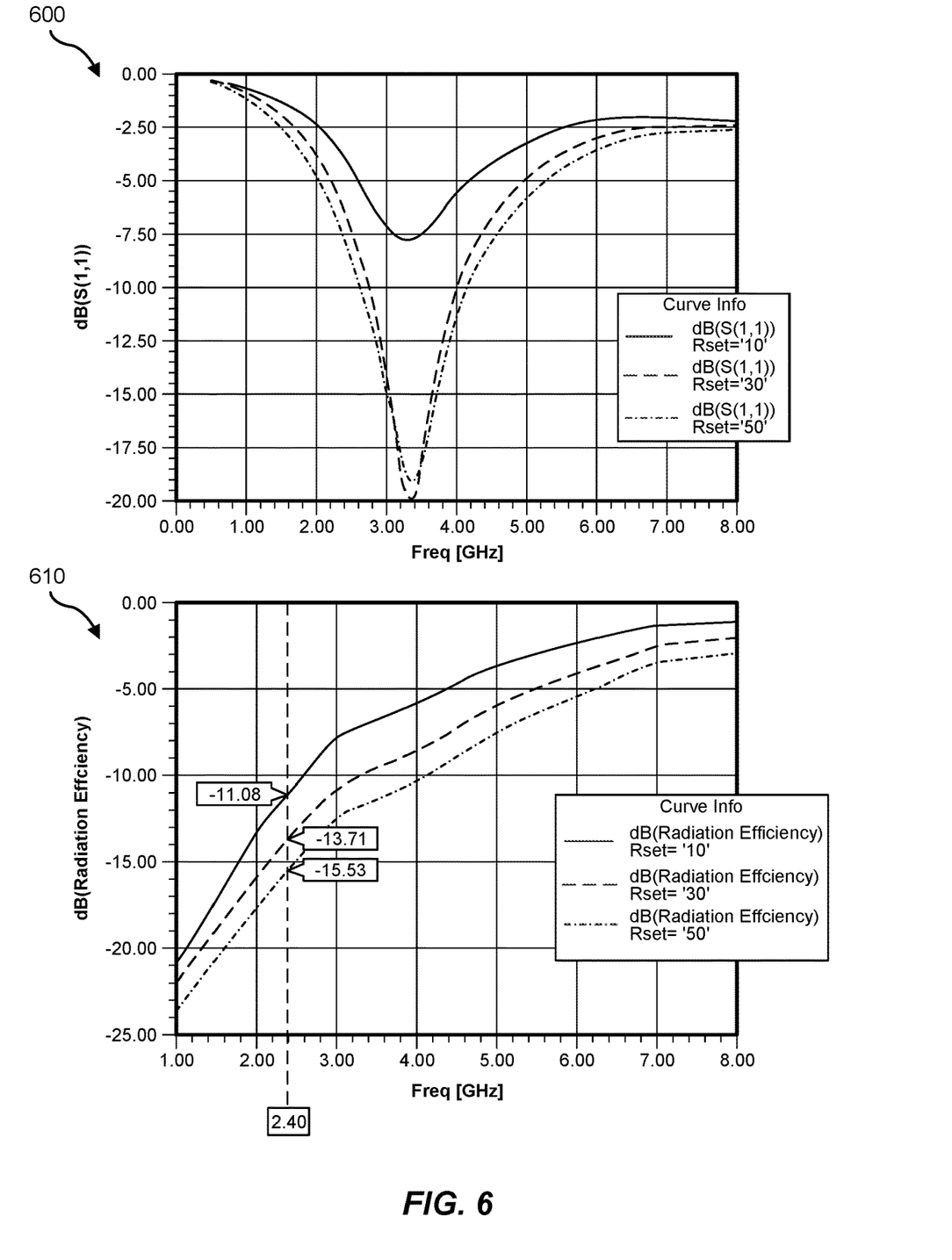
FIG. 6 shows a set of views of charts that illustrate possible improvements that some embodiments described herein may provide.
Figure 7:
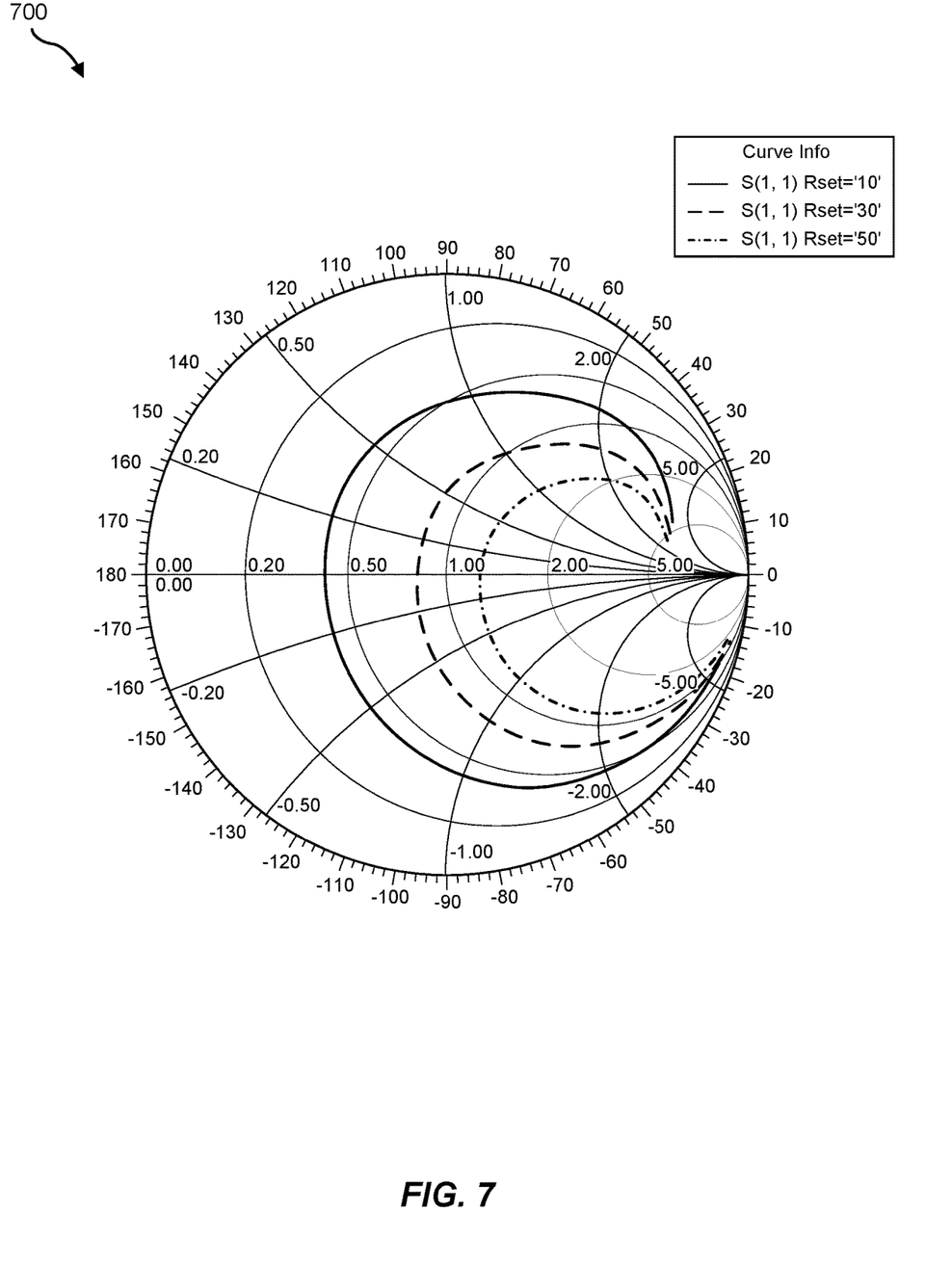
FIG. 7 shows a view of a Smith chart that illustrates possible improvements that some embodiments described herein may provide.

The embodiments described above in reference to FIG. 5 may provide and/or demonstrate favorable or unique features and/or attributes for antenna functionality in touch-screen-enabled devices. FIGS. 6-7 illustrate possible experimental results that may be achieved through antenna and touch pad configurations similar to those shown in FIG. 5. FIG. 6 shows a chart 600 that plots curves of S-parameter S(1,1) values in decibels versus frequency in GHz for three different sheet resistance values: 10 Ω/sq., 30 Ω/sq., and 50 Ω/sq. FIG. 6 also shows a chart 610 that plots curves of radiation efficiency in decibels versus frequency in GHz for three different sheet resistance values: 10 Ω/sq., 30 Ω/sq., and 50 Ω/sq. Likewise, FIG. 7 shows a Smith chart 700 that plots impedance versus frequency curves for the three different sheet resistance values: 10 Ω/sq., 30 Ω/sq., and 50 Ω/sq.

Figure 8:
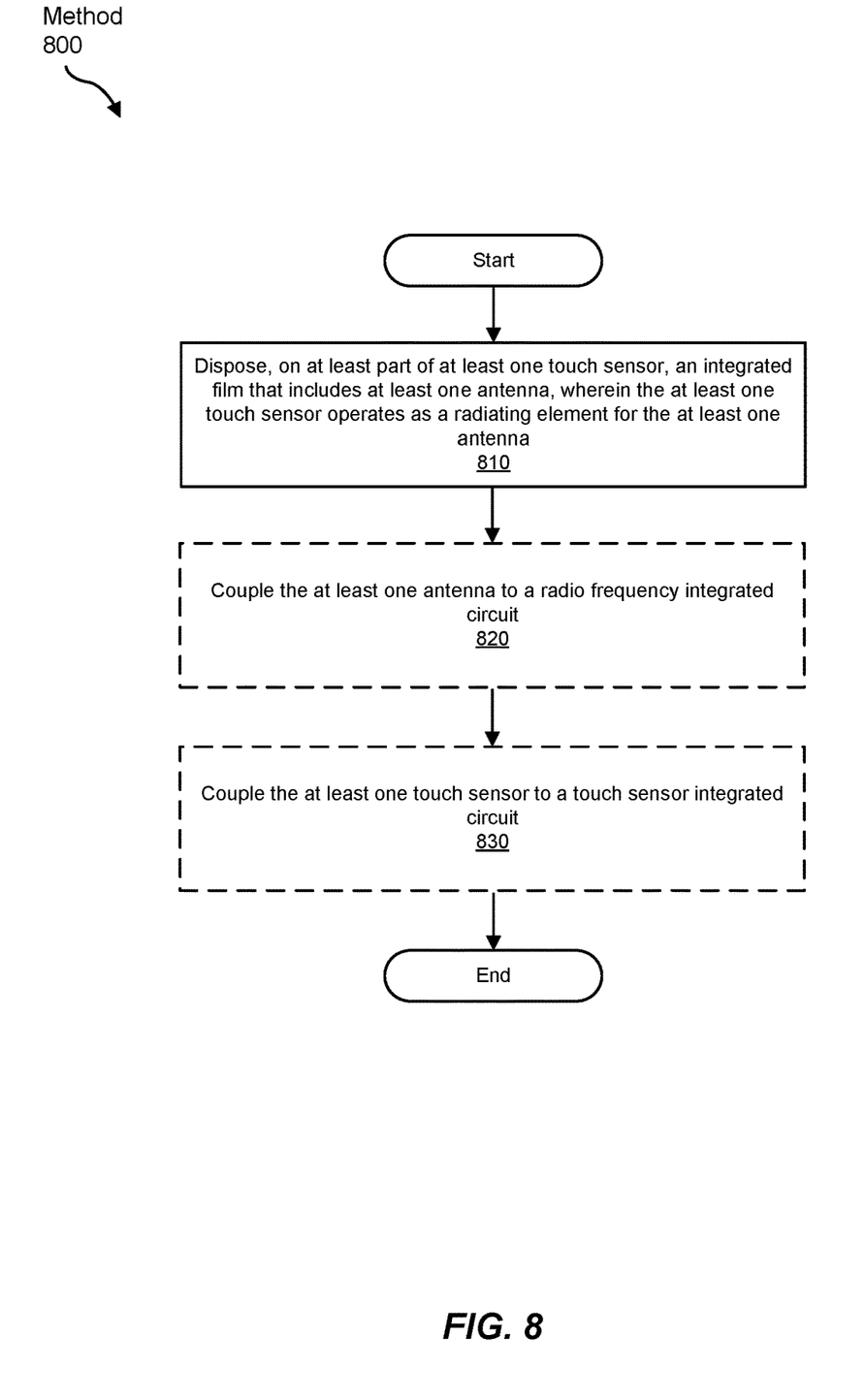
FIG. 8 is a flow diagram of an example method of manufacture for touch sensors with antenna integrated film as described herein.

FIG. 8 is a flow diagram of an example method 800 of manufacture for a touch sensor with integrated antenna film in accordance with some embodiments described herein. The steps shown in FIG. 8 may be performed by any suitable device, instrumentality, and/or system. Note that dashed lines indicate optional operations that may optionally be included in an example method. As illustrated in FIG. 8, at step 810, one or more suitable devices, instrumentalities, and/or systems may dispose, on at least part of at least one touch sensor, an integrated film that includes at least one antenna, wherein the at least one touch sensor operates as a radiating element for the at least one antenna. This may be accomplished in any suitable way. For example, as described above in relation to FIG. 2, a suitable device, instrumentality, and/or system may dispose an integrated film that includes antenna element 206 on touch pad and antenna layer 110 such that one or more touch pad elements included in touch pad and antenna layer 110 operate as a radiating element for antenna element 206. Additionally or alternatively, in embodiments like that shown in FIG. 5, a suitable device, instrumentality, and/or system may dispose an integrated film that includes an antenna element on touch pad and antenna layer 510 such that one or more touch pad elements included in touch pad and antenna layer 510 (e.g., touch pad element 502) operate as a radiating element for an antenna included in the integrated film.

The integrated film that includes the at least one antenna may be disposed upon at least part of the at least one touch sensor in any suitable way. For example, as described in greater detail above, disposing the integrated film on at least part of the at least one touch sensor may include forming the at least one touch sensor and the integrated film from a common substrate. Accordingly, when the antenna is excited, either in a transmitting capacity or in a receiving capacity, the touch sensor may also be excited. In this manner, the touch sensor itself may act as a radiating element that is part of an antenna.

As also illustrated in FIG. 8 at operation 820, shown in dashed lines to indicate that it is an optional operation, one or more suitable devices, instrumentalities, and/or systems may couple the at least one antenna to a RFIC. For example, as illustrated in FIG. 2, antenna element 206 may be coupled (i.e., communicatively coupled, electrically coupled, physically coupled, etc.) to an RFIC via RFIC feed 208. Likewise, as shown in FIG. 5, touch pad element 502, configured to operate as a radiating element for an antenna element disposed upon touch pad element 502, may be coupled to RFIC 514 via RFIC feed 508 and/or capacitor 512.

As further illustrated in FIG. 8 at operation 830, shown in dashed lines to indicate that it is an optional operation, one or more suitable devices, instrumentalities, and/or systems may couple the at least one touch sensor to a TPIC. For example, as illustrated in FIG. 2, touch pad element 202 may be coupled (i.e., communicatively coupled, electrically coupled, physically coupled, etc.) to a TPIC via TPIC feed 204. Likewise, as shown in FIG. 5, touch pad element 502, configured to operate as a radiating element for an antenna element disposed upon touch pad element 502, may be coupled to TPIC 516 via TPIC feed 504.

As discussed throughout the instant disclosure, the disclosed systems and methods may provide one or more advantages over traditional options for placing antennas on wearable or otherwise space-limited electronic devices. For example, as described above, embodiments of the systems and methods described herein may enable one or more antennas may be at least partially placed on a display portion of an electronic device. These antennas may be transparent and, as such, may not occlude vision through the display.

In some cases, embodiments of AoDs described herein may be integrated into touch sensors that are part of touch-screen displays. In such cases, the touch sensor pattern and the antenna pattern may be formed on the same substrate. This may reduce the cost of having additional layers (e.g., laminated to and/or formed within the substrate) and may also reduce a number of manufacturing issues that may be caused by having an increased number of layers within a display stack. When forming the touch sensor pattern and the antenna pattern on the same substrate, the area of the touch sensor/antenna pattern may be used to maximize the performance of both the touch sensor and the antenna. As shown in experimental results described herein, embodiments of this disclosure may provide significantly improved antenna performance over conventional antenna options while also conserving space and facilitating the functions of the touch display.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
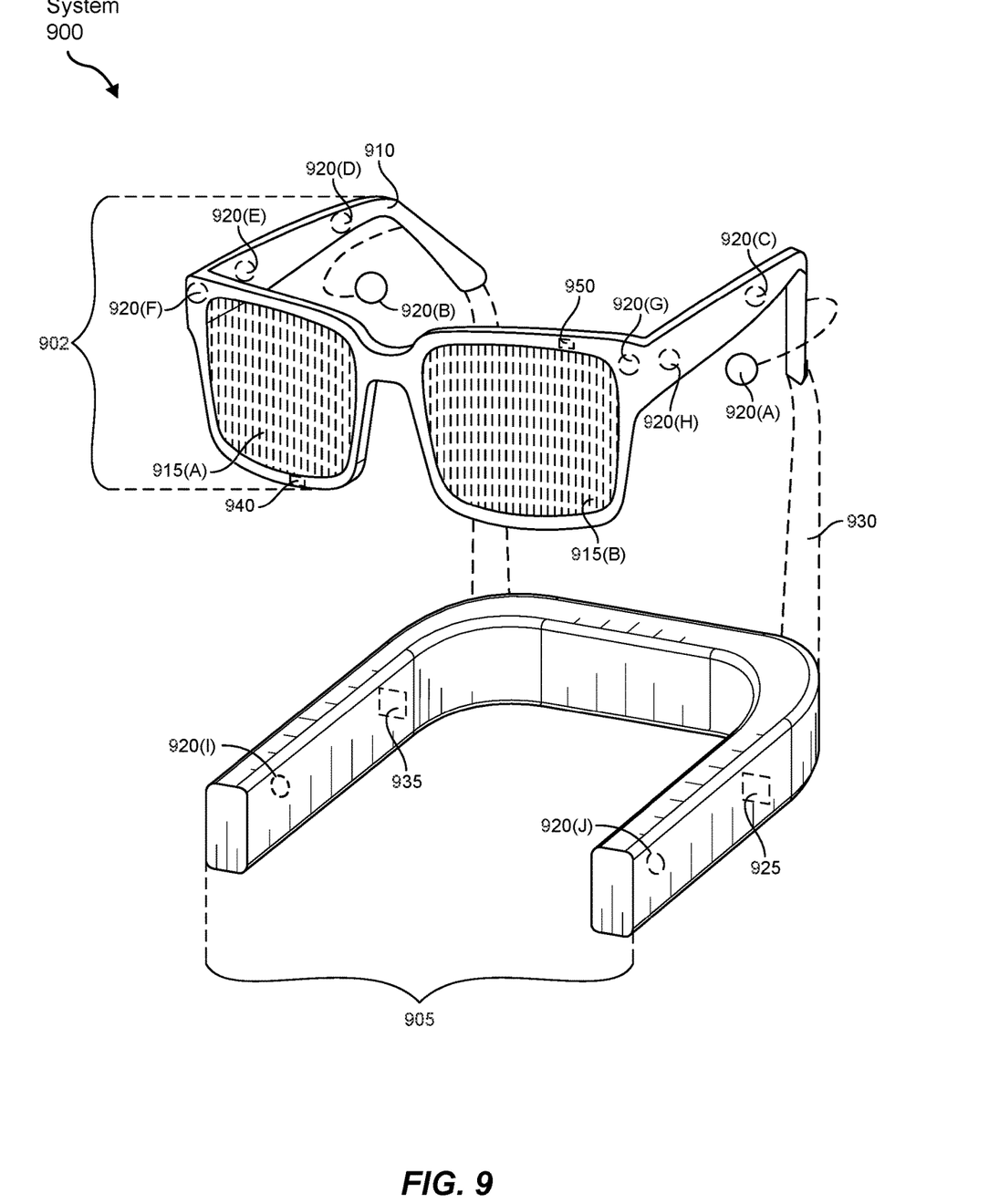
FIG. 9 is an illustration of exemplary augmented-reality glasses that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(1) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality system 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(1) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(1) and 920(J) may be positioned on neckband 905, thereby increasing the distance between the neckband acoustic transducers 920(1) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium-ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Figure 10:
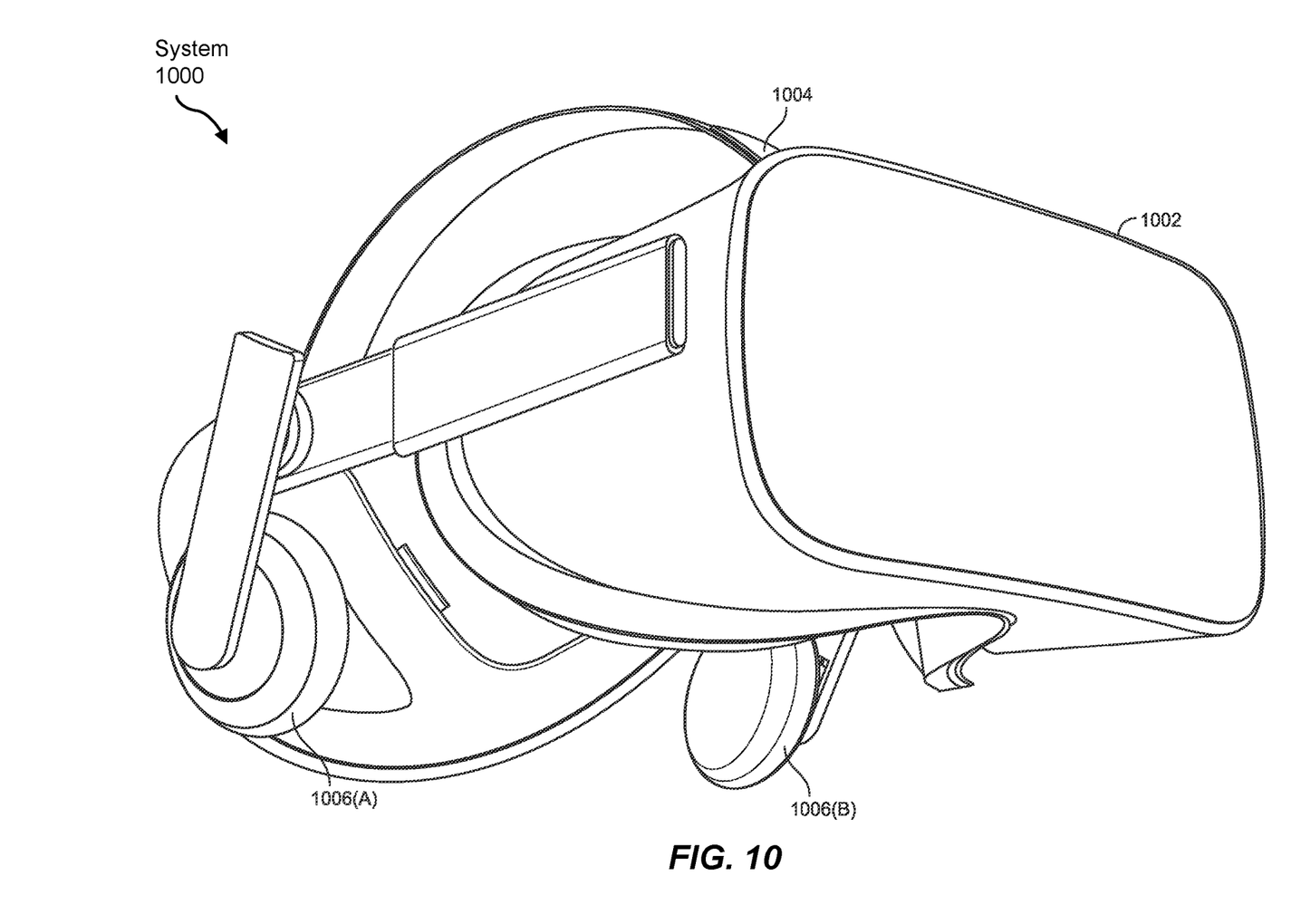
FIG. 10 is an illustration of an exemplary virtual-reality headset that may be used in connection with embodiments of this disclosure.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The following example embodiments are also included in this disclosure:

Example 1: An apparatus comprising (1) at least one touch sensor, and (2) an integrated film that includes at least one antenna, (3) wherein the integrated film is at least partially disposed on the at least one touch sensor, such that the at least one touch sensor operates as a radiating element for the at least one antenna.

Example 2: The apparatus of claim 1, wherein the at least one touch sensor and the integrated film that includes the at least one antenna are formed on a common substrate.

Example 3: The apparatus of claim 2, wherein the at least one antenna and the at least one touch sensor are formed within a common plane of the common substrate.

Example 4: The apparatus of claim 1, wherein the at least one touch sensor operates as both a touch sensor and a radiating element for the at least one antenna.

Example 5: The apparatus of claim 1, wherein the at least one touch sensor and the at least one antenna are formed using a transparent conductive material.

Example 6: The apparatus of claim 5, wherein a measurement of sheet resistance of the transparent conductive material is between 10 to 200 Ω/sq.

Example 7: The apparatus of claim 5, wherein the transparent conductive material comprises a mesh metal.

Example 8: The apparatus of claim 1, further comprising a capacitor in series between the at least one antenna and a radio frequency integrated circuit (RFIC).

Example 9: The apparatus of claim 8, wherein an antenna feed line's resistance between the at least one antenna and a touch panel integrated circuit is at least 300Ω.

Example 10: The apparatus of claim 9, wherein the at least one touch sensor and the touch panel integrated circuit are electrically connected without an in-series inductor.

Example 11: The apparatus of claim 1, wherein the at least one touch sensor and the integrated film each include a slot cutout in at least a portion thereof.

Example 12: A system comprising (1) at least one touch sensor disposed on a face of a smart watch, and (2) an integrated film disposed at least partially on the at least one touch sensor, the integrated film comprising at least one antenna, (3) wherein the at least one touch sensor operates as a radiating element for the at least one antenna.

Example 13: The system of claim 12, wherein (1) the at least one touch sensor comprises a touch pattern, and (2) the at least one touch sensor operates as the radiating element for the at least one antenna via the touch pattern.

Example 14: The system of claim 12, wherein the at least one touch sensor and the at least one antenna are formed using a transparent conductive material.

Example 15: The system of claim 14, wherein a measurement of sheet resistance of the transparent conductive material is between 10 to 200 Ω/Sq.

Example 16: The system of claim 14, wherein the transparent conductive material comprises mesh metal.

Example 17: The system of claim 12, further comprising an antenna feed line coupled to the at least one antenna and a radio frequency integrated circuit (RFIC) included in the smart watch.

Example 18: The system of claim 12, wherein (1) the smart watch further comprises a touch panel integrated circuit communicatively coupled to the at least one touch sensor, and (2) a resistance between the at least one antenna and the touch panel integrated circuit is at least 300Ω.

Example 19: A method comprising (1) disposing, on at least part of at least one touch sensor, an integrated film that includes at least one antenna, (2) wherein the at least one touch sensor operates as a radiating element for the at least one antenna.

Example 20: The method of claim 19, wherein disposing the integrated film on at least part of the at least one touch sensor comprises forming the at least one touch sensor and the integrated film from a common substrate.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An apparatus comprising:
    at least one touch sensor;
    an integrated film that includes at least one antenna; and
    a capacitor in series between the at least one antenna and a radio frequency integrated circuit,
    wherein:
        the integrated film is at least partially disposed on the at least one touch sensor, such that the at least one touch sensor operates as a radiating element for the at least one antenna;
        an antenna feed line's resistance between the at least one antenna and a touch panel integrated circuit is at least 300Ω; and
        the at least one touch sensor and the touch panel integrated circuit are electrically connected without an in-series inductor.

2. The apparatus of claim 1, wherein the at least one touch sensor and the integrated film that includes the at least one antenna are formed on a common substrate.

3. The apparatus of claim 2, wherein the at least one antenna and the at least one touch sensor are formed within a common plane of the common substrate.

4. The apparatus of claim 1, wherein the at least one touch sensor operates as both a touch sensor and a radiating element for the at least one antenna.

5. The apparatus of claim 1, wherein the at least one touch sensor and the at least one antenna are formed using a transparent conductive material.

6. The apparatus of claim 5, wherein a measurement of sheet resistance of the transparent conductive material is between 10 to 200 Ω/sq.

7. The apparatus of claim 5, wherein the transparent conductive material comprises a mesh metal.

8. The apparatus of claim 1, wherein the at least one touch sensor and the integrated film each include a slot cutout in at least a portion thereof.

9. A system comprising:
    at least one touch sensor disposed on a face of a smart watch, the smart watch further comprising a touch panel integrated circuit electrically coupled to the at least one touch sensor without an in-series inductor;
    an integrated film disposed at least partially on the at least one touch sensor, the integrated film comprising at least one antenna; and
    an antenna feed line coupled to the at least one antenna and a radio frequency integrated circuit included in the smart watch, wherein:
the at least one touch sensor operates as a radiating element for the at least one antenna; and
a resistance between the at least one antenna and the touch panel integrated circuit is at least 300Ω.

10. The system of claim 9, wherein:
the at least one touch sensor comprises a touch pattern; and
the at least one touch sensor operates as the radiating element for the at least one antenna via the touch pattern.

11. The system of claim 9, wherein the at least one touch sensor and the at least one antenna are formed using a transparent conductive material.

12. The system of claim 11, wherein a measurement of sheet resistance of the transparent conductive material is between 10 to 200 Ω/Sq.

13. The system of claim 11, wherein the transparent conductive material comprises mesh metal.

14. The system of claim 9, wherein the at least one touch sensor and the integrated film that includes the at least one antenna are formed on a common substrate.

15. The system of claim 14, wherein the at least one antenna and the at least one touch sensor are formed within a common plane of the common substrate.

16. The system of claim 9, wherein the at least one touch sensor operates as both a touch sensor and a radiating element for the at least one antenna.

17. A method comprising:
disposing, on at least part of at least one touch sensor, an integrated film that includes at least one antenna; and
electrically connecting the at least one touch sensor to a touch panel integrated circuit without an in-series inductor,
wherein:
the at least one touch sensor operates as a radiating element for the at least one antenna;
a capacitor is in series between the at least one antenna and a radio frequency integrated circuit (RFIC); and
an antenna feed line's resistance between the at least one antenna and a touch panel integrated circuit is at least 300Ω.

18. The method of claim 17, wherein disposing the integrated film on at least part of the at least one touch sensor comprises forming the at least one touch sensor and the integrated film from a common substrate.

19. The method of claim 18, wherein forming the at least one touch sensor and the integrated film on the common substrate comprises forming the at least one antenna and the at least one touch sensor within a common plane of the common substrate.

20. The method of claim 17, wherein the at least one touch sensor and the at least one antenna are formed using a transparent conductive material.

* * * * *